Patented Aug. 4, 1953

2,647,910

UNITED STATES PATENT OFFICE 2,647,910

ORGANIC ANTIMONY DERIVATIVES OF POLYHYDROXY ALKANOIC OR ALKANEDIOIC ACIDS AND THEIR PREPARATION

Sydney Archer and Robert K. Bair, Albany, N. Y., assignors to Sterling Drug Inc., New York, N. Y., a corporation of Delaware No Drawing. Application March 10, 1951,
Serial No. 215,014

14 Claims. (Cl. 260—446)

This invention relates to new organic antimony compounds in which one of the antimony linkages is directly connected to an aromatic nucleus and in which two of the antimony linkages are connected to alcoholate oxygen atoms of a salt of a polyhydroxy alkanoic or alkanedioic acid, and to a process of preparing said antimony compounds.

More particularly, our compounds are organic compounds of antimony in which one of the antimony linkages is directly connected to a nuclear carbon atom of an aryl radical selected from the group consisting of the unsubstituted phenyl radical and phenyl radicals substituted by from one to three substituents selected from the class consisting of halo, lower alkyl, lower alkoxyl, lower carbaloxyl, hydroxyl, nitro, carbamyl, amino, lower alkanoylamino, sulfamyl, N-2-thiazolylsulfamyl and N-2-pyrimidylsulfamyl, two of the antimony linkages are connected to alcoholate oxygen atoms of a salt of an acid selected from the group consisting of lower polyhydroxyalkanoic and lower polyhydroxyalkanedioic acids having from three to seven carbon atoms and, where antimony is pentavalent, the remaining two antimony linkages are connected to a single oxygen atom.

The aforesaid substituents of the aryl radical can be in any of the available positions of the phenyl nucleus, and when more than one, can be the same or different and can be in any of the various position combinations relative to each other. The halo substituents are chloro, bromo, iodo and fluoro. The lower alkyl and lower alkoxyl substituents are radicals having one to six carbon atoms, such as methyl, ethyl, n-propyl, isopropyl, isobutyl, 2-butyl, n-butyl, n-amyl and n-hexyl for alkyl, and methoxyl, ethoxyl, n-propoxyl, isobutoxyl, n-butoxyl, isoamoxyl and n-hexoxyl for alkoxyl. The lower carbalkoxyl substituents are radicals having two to seven carbon atoms, such as carbomethoxyl, barbethoxyl, carbo-n-propoxyl, carboisobutoxyl, carbo-n-butoxyl and carbo-n-hexoxyl. The lower alkanoylamino substituents have from one to six carbon atoms, such as formylamino, acetylamino, propionylamino, butyrylamino, caproylamino, and the like.

The lower polyhydroxyalkanoic acids and lower polyhydroxyalkanedioic acids mentioned above are those preferably having three to seven carbon atoms inclusive and bearing from two to six hydroxy radicals inclusive, there being not more than one hydroxyl group on a given carbon atom. These include the aldonic acids, such as gluconic, arabonic, ribonic and glucoheptonic (alkanoic acids); the saccharic acids such as saccharic and mucic (alkanedioic acids); tartaric acid (alkanedioic acid; and glyceric acid (alkanoic acid). In practicing our invention, we preferred, for the most part, to use a salt of gluconic acid because such salts are easily prepared from delta-gluconolactone, a readily available and inexpensive compound. The compounds derived from hexonic (or polyhydroxy hexanoic) acids have the probable structural formula

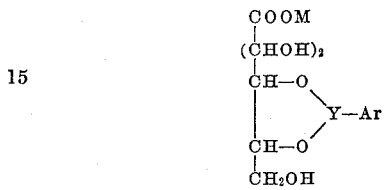

where M is a nontoxic cation, Y is Sb or SbO and Ar an aryl radical of the benzene series as defined above. While the location of the antimony-oxygen linkages is not known precisely, on theoretical grounds the above formula seem the most acceptable. In any case our invention is not dependent upon the location of such bonds and it is not limited to any particular structural formula which may be selected for our compounds.

In the above formula, when Y represents Sb (trivalent antimony) the term "stibinyl" is used, and similarly when Y represents SbO (pentavalent antimony) the term "stibonyl" applies. This nomenclature is illustrated by the following examples:

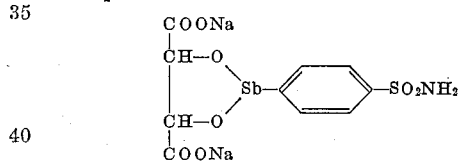

which is called disodium p-sulfamylbenzenestibinyltartrate; and

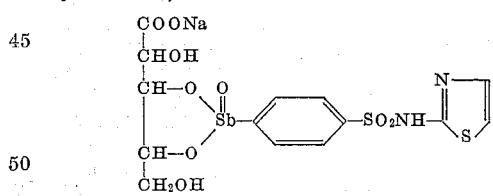

which is sodium 4-(N-2-thiazolylsulfamyl)benzenestibonylarabonate.

In the formulae given above M, the cation portion of the compounds of our invention, represents any nontoxic cation whether inorganic or organic. Such nontoxic cations are well-known in the art. The inorganic cations are ammonium, sodium, potassium, calcium, magnesium, and the like. The organic cations are ammonium radicals substituted by lower alkyl and lower hydroxyalkyl radicals, and include such cations as ethylammonium, diethylammonium, beta-hydroxyethylammonium, beta-hydroxyethyldiethylammonium, and the like. Generally, the salts easily soluble in water are preferred since these are particularly suitable for use in aqueous solution, and these salts as a group are those in which the cation is ammonium, organically substituted ammonium as described above, or alkali metal. Salts only very slightly soluble in water, such as the calcium salt, find other applications. These slightly water-soluble salts are prepared by mixing aqueous solutions of a water-soluble salt of any of the complex organic antimony compounds of the present invention with a water-soluble salt of a metal, such as calcium, and collecting the precipitated slightly water-soluble salt.

Our invention also relates to a novel method of preparation of our new compounds, which comprises reacting a salt of a lower polyhydroxyalkanoic acid or a lower polyhydroxyalkanedioic acid, as defined above, with an aryl antimony polyhalide in the presence of a weak base, such as an organic amine, to remove the hydrogen halide liberated.

By aryl antimony polyhalide is meant generically arylstibinic dihalides and arylstibonic tetrahalides, having the respective formulae, $ArSbX_2$ and $ArSbX_4$, where X represents halogen and Ar is a radical of the benzene series as defined above, as well as these compounds in double salt combination with amine halides. Such double salts may be illustrated by the pyridiniom, quinolinium and ammonium halide double salts having the respective formulae, $ArSbX_2.C_5H_5N.HX$, $ArSbX_4.C_5H_5N.HX$, $ArSbX_2.C_9H_7N.HX$
$ArSbX_4.C_9H_7N.HX$, $ArSbX_2.NH_4X$ and $ArSbX_4.NH_4X$, where $C_5H_5N$ and $C_9H_7N$ are pyridine and quinoline, respectively (see Christiansen, "Organic Derivatives of Antimony," The Chemical Catalog Co., New York, N. Y., 1925, pp. 132–6 and 162–3). In practicing our invention we prefer to use the pyridinium chloride double salts, i. e., the pyridinium arylstibinic trichlorides having the formula $ArSbCl_2.C_5H_5N.HCl$ and the pyridinium arylstibonic pentachlorides having the formula $ArSbCl_4.C_5H_5N.HCl$, which are prepared with relative facility and are easily handled crystalline compounds.

Our preferred process in practicing our invention comprises warming an aqueous solution of an alkali, ammonium, or amine salt of a hexonic acid, desirably in the presence of an aliphatic amine, with a pyridinium arylstibonic pentachloride or a pyridinium arylstibinic trichloride, as shown above. The water-soluble organic antimony complex is isolated by adding the aqueous reaction mixture to an organic solvent, such as ethanol or other water soluble alcohols, or alcohol-ether mixtures. We prefer to use ethanol in practice because of its availability and low cost. If an amine is used to remove the hydrogen halide formed during the process, it is preferable to use a low-molecular weight, aliphatic amine such as diethylaminoethanol, diethylamine, and the like. Such amines form hydrohalides which are soluble in lower alcohols, such as ethanol, and in certain mixtures of ether and alcohol, thereby facilitating the isolation of the desired product in pure form from the reaction mixture.

The compounds of our invention are useful for purposes to which water-soluble antimony compounds are applied, for instance, for combatting parasites including leishmanial and schistosomal organisms.

Our invention may be further understood by reference to the following examples, which illustrate specific embodiments of the invention.

*Example 1*

To a stirred, chilled solution of sodium gluconate, prepared by dissolving 14.2 g. (0.080 mole) of delta-gluconolactone and 3.2 g. (0.080 mole) of sodium hydroxide in 80 ml. of water, are added 40.9 g. (0.080 mole) of pyridinium 4-acetamidobenzenestibonic pentachloride followed by the dropwise addition of a mixture of 56 g. (0.48 mole) of beta-diethylaminoethanol and 56 ml. of water. After removal of the ice bath, the temperature slowly rises to 27° C. with gradual dissolution of the yellow pyridinium complex; complete dissolution is effected by heating the mixture on a steam bath at 55° C. Decolorizing charcoal is added and stirring at this elevated temperature is continued for 25 minutes. After filtering through a filter air such as Filter-Cel, the filtrate is slowly added to 10 volumes of stirred, chilled 95% ethanol. The finely-divided white precipitate is filtered, transferred while still moist to a vacuum desiccator, and dried overnight in vacuo over sulfuric acid. A second crop is obtained on chilling the mother liquor overnight in an ice box. Both crops contain a trace of chloride ion.

The combined crops are dissolved in 55 ml. of water, filtered after charcoaling, and the filtrate is added dropwise with stirring to 600 ml. of chilled absolute ethanol. After standing overnight in an ice box, the finely-divided solid is collected, using a sintered glass funnel, washed with absolute ethanol, and transferred while moist to a vacuum desiccator and dried. The solid thus obtained is powdered and dried further in vacuo to yield a powder, which is water-soluble and which contains no chloride ion. A second crop is obtained from the mother liquor.

The combined crops are dissolved in 50 ml. of water, a little Filter-Cel and activated alumina are added, the mixture is filtered, and the filtrate is added dropwise to a 50–50 mixture of ether-absolute ethanol (600 ml.). After standing for a day, the cloudy supernatant liquid is decanted from the separated product, which is then slurried with absolute alcohol, filtered, washed with absolute ethanol, and dried in vacuo over sulfuric acid to yield a white, water-soluble material free from chloride. The pH of a 1% aqueous solution is 5.9. This product, sodium 4-acetamidobenzenestibonylgluconate, described above, has the probable structural formula

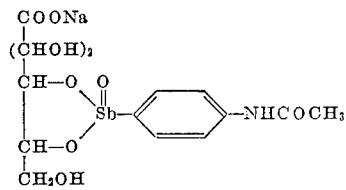

A sample thus prepared weighed about 17 g. and gave the following analysis. Calcd. for $C_{14}H_{17}NNaO_9Sb$: Sb, 24.9; N, 2.87. Found: Sb (dry basis) 24.0, 24.6; N (dry basis), 2.89; moisture (100° C.), 6.4.

When the foregoing procedure is followed using other aryl antimony polyhalides in place of pyridinium 4-acetamidobenzenestibonic pentachloride, the corresponding sodium aryl antimony gluconates are obtained. Thus, using 4-acetamidobenzenestibinic dichloride, 3-amino-4-hydroxybenzenestibinic dichloride, 3-aminobenzenestibinic diiodide, 4-aminobenzenestibonic tetrachloride, quinolium 3-aminobenzenestibonic pentachloride, pyridinium 4-carbethoxybenzenestibonic pentachloride, ammonium 3-n-butyrylamino - 4 - chlorobenzenestibonic pentachloride and pyridinium 4-caproylaminobenzenestibonic pentachloride, there is obtained, respectively, sodium 4-acetamidobenzenestibinylgluconate, sodium 3-amino-4-hydroxybenzenestibinylgluconate, sodium 3-aminobenzenestibinylgluconate, sodium 4-aminobenzenestibonylgluconate, sodium 3-aminobenzenestibonylgluconate, sodium 4-carbethoxybenzenestibonylgluconate, sodium 3-n-butyrylamino-4-chlorobenzenestibonylgluconate and sodium 4-caproylaminobenzenestibonylgluconate.

*Example 2*

To a stirred solution of sodium gluconate, prepared by dissolving 9.1 g. (0.05 mole) of delta-gluconolactone and 2.0 g. (0.05 mole) of sodium hydroxide in 50 ml. of water, are added 27.9 g. (0.05 mole) of pyridinium 4-acetamido-3-chlorobenzenestibonic pentachloride followed by the dropwise addition of a solution of 35 g. (0.30 mole) of beta-diethylaminoethanol in 35 ml. of water; the temperature rises to 40° C. with most of the pyridinium complex dissolving, yielding a light brown solution. Stirring is continued at 40–45° for 15 minutes after the addition of several grams of activated alumina; the mixture is then filtered, and the filtrate is added dropwise to 700 ml. of stirred, chilled absolute ethanol with very little precipitation resulting. Then, to this stirred, chilled mixture is added slowly 700 ml. of ether, whereupon a light brown, oily material separates. The supernatant liquid is decanted and the oily product is triturated with absolute ethanol to yield a solid, which is filtered, washed with absolute ethanol, and dried in vacuo.

The pale brown powder is dissolved in 80 ml. of methanol plus 13 ml. of water, the solution is filtered, and the filtrate is added dropwise to 700 ml. of stirred, chilled absolute ethanol. After standing in an ice box overnight, the supernatant liquid is decanted, and the gummy product is triturated with absolute ethanol to yield a solid material, which is filtered, washed with absolute ethanol, and dried in vacuo. This tan amorphous product, sodium 4-acetamido-3-chlorobenzenestibonylgluconate, has the probable structural formula

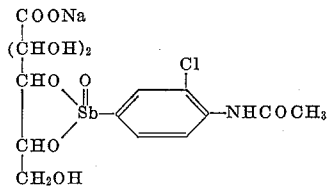

A sample thus prepared weighed about 17 g. and gave the following analysis. Calcd. for $C_{14}H_{16}ClNNaO_9Sb$: Sb, 23.3; N, 2.68. Found: Sb (dry basis), 19.9, 20.4; N (dry basis), 2.85; moisture (room temperature over $P_2O_5$ for 96 hours), 1.35.

*Example 3*

This preparation is carried out like Example 3, but using 17.8 g. (0.10 mole) of delta-gluconolactone, 4.0 g. (0.10 mole) of sodium hydroxide, 100 ml. of water, 45.6 g. (0.10 mole) of pyridinium benzenestibonic pentachloride, 70 g. of beta-diethylaminoethanol and 70 ml. of water, and a mixture of 1 liter of absolute ethanol with 1 liter of ether. After the addition of the aqueous solution of diethylaminoethanol, the temperature is about 48° C. A gram or so of insoluble material still remains after stirring the reaction mixture for 15 minutes at 55° C. The mixture is filtered and the filtrate is added, with stirring and chilling, to the alcohol-ether mixture; a solid begins to separate, but then becomes gummy. After decantation of the supernatant liquid and trituration of the gummy material with absolute ethanol, the solid product is filtered, washed with absolute ethanol, and dried in vacuo to give a white powder, which contains a trace of chloride ion.

The crude product is purified by dissolving it in a mixture of 150 ml. of methanol and 25 ml. of water, the solution is filtered, and the filtrate is trickled into a stirred, chilled mixture of 700 ml. of absolute ethanol and 500 ml. of ether. The mixture is placed in an ice box overnight, the milky supernatant liquid is decanted, and the product is filtered, washed with absolute ethanol and then ether, and dried in vacuo to yield a white powder which is sodium benzenestibonylgluconate and has the probable structural formula

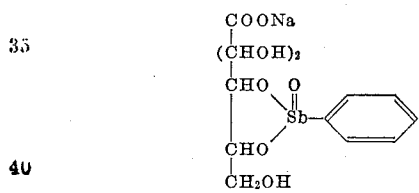

A sample prepared as described above weighed about 30 g. and gave the following analysis. Calcd. for $C_{12}H_{14}NaO_8Sb$: Sb, 28.3; Na, 5.33. Found: Sb (dry basis), 25.8, 25.8; Na (dry basis), 5.56; moisture (100° C.), 4.07.

Sodium benzenestibonylgluconate is also obtained when the above procedure is followed using instead of pyridinium benzenestibonic pentachloride any of the following reactants: benzenestibonic tetrachloride, ammonium benzenestibonic pentachloride or quinolinium benzenestibonic pentachloride.

Related sodium aryl antimony gluconates are obtained by using the appropriate aryl antimony polyhalide in place of pyridinium benzenestibonic pentachloride in the above procedure. Thus, sodium benzenestibinylgluconate is obtained from benzenestibinic dichloride, benzenestibinic diiodide, pyridinium benzenestibinic trichloride or quinolinium benzenestibinic trichloride; sodium 4 - methylbenzenestibinylgluconate, from 4-methylbenzenestibinic dichloride, ammonium 4-methylbenzenestibinic trichloride, pyridinium 4-methylbenzenestibinic trichloride or quinolinium 4-methylbenzenestibinic trichloride; sodium 4-n-hexylbenzenestibonylgluconate, from pyridinium 4-n-hexylbenzenestibonic pentachloride; sodium 3-ethylbenzenestibonylgluconate, from pyridinium 3-ethylbenzenestibonic pentachloride.

*Example 4*

17.8 g. (0.10 mole) of delta-gluconolactone and 8.0 g. (0.20 mole) of sodium hydroxide are dissolved in 100 ml. of water. To this solution of sodium gluconate are added 49.3 g. (0.10 mole) of pyridinium 4-carbamylbenzenestibonic pentachloride followed by the dropwise addition of a mixture of 70 g. (0.60 mole) of beta-diethylaminoethanol and 70 ml. of water, keeping the temperature between 47–50°. The solution is filtered and the chilled filtrate is added dropwise with stirring to about 1700 ml. of chilled 95% ethanol. After keeping the mixture in an ice box overnight, the white solid is filtered, washed with ethanol and dried in vacuo; this product contains chloride ion.

The crude material is dissolved in 115 ml. of water, the solution is slurried with a little Filter-Cel and activated alumina, and the mixture is filtered. The filtrate is added dropwise to 1.2 liters of a 50–50 mixture of absolute ethanol-ether with stirring and chilling. The mixture is placed in an ice box for several hours, the supernatant liquid decanted, and the gummy product triturated with absolute ethanol, filtered, washed with absolute ethanol and dried in vacuo. The white solid still gives a positive test for chloride ion. The purification procedure (dissolution in water and addition of aqueous solution to excess 95% ethanol) is repeated to yield about 36 g. of sodium 4-carbamylbenzenestibonylgluconate free from chloride ion. It has the probable structural formula

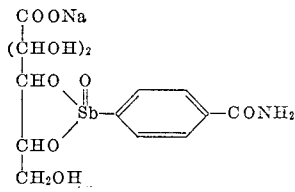

The pH of a 1% aqueous solution was found to be 6.6. A sample thus prepared gave the following analysis. Calcd. for $C_{13}H_{15}NNaO_9Sb$: Sb, 25.5; N, 2.95. Found: Sb (dry basis), 23.4, 22.6; N (dry basis), 2.65; moisture (100°), 6.1

*Example 5*

This preparation is carried out in a manner similar to the previous examples, but using 35.6 g. (0.20 mole) of delta-gluconolactone and 8.0 g. (0.20 mole) of sodium hydroxide in 200 ml. of water, 107.0 g. (0.20 mole) of pyridinium 4-sulfamylbenzenestibonic pentachloride, 140 g. each of beta-diethylaminoethanol and water, and 5 liters of 95% ethanol. After the solution of the amine in water is added, the clear resulting solution is charcoaled and added to the alcohol. A gum results which is separated by decantation from the mother liquor and covered with 500 ml. of absolute ethanol; on standing this gum solidifies. The solid, which is filtered and dried in vacuo, weighs 73.8 g. This product is dissolved in 150 ml. of water, charcoaled, and the clear solution added dropwise to 1500 ml. of absolute ethanol. The sodium 4-sulfamylbenzenestibonylgluconate is filtered, washed with absolute ethanol and dried in vacuo (over $CaCl_2$ at 0.5 mm.) to yield a product, which has the probable structural formula

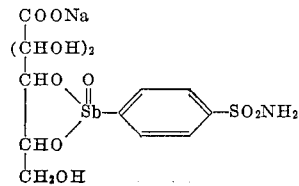

A sample thus prepared weighed 56 g. and gave the following analysis. Calcd, for $C_{12}H_{15}NNaO_{10}SSb$: Sb, 23.9 Found: (dried over $P_2O_5$ at 0.5 mm.): Sb, 22.9, 23.3.

*Example 6*

This preparation is carried out in a manner similar to preceding examples using 10.2 g. (0.057 mole) of delta-gluconolactone, 2.3 g. (0.057 mole) of sodium hydroxide, 60 ml. of water, 35.0 g. (0.057 mole) of pyridinium 4-(N-2-pyrimidylsulfamyl)benzenestibonic pentachloride, 40 g. (0.34 mole) of beta-diethylaminoethanol, and 40 ml. of water. After the dropwise addition of the aqueous amine solution is completed, the temperature is 49° and some insoluble material is present. The stirred mixture is warmed over steam to about 55° C. for an additional 10 minutes and complete dissolution results. The solution is filtered and the light colored filtrate is added dropwise with stirring to 1.4 liters of chilled absolute ethanol. After standing in ice about 30 minutes, the slightly colored product is filtered, washed with absolute ethanol, and dried in vacuo to give light colored powder.

This crude product is dissolved in 50 ml. of water, the solution is filtered, and the filtrate is added slowly to 1 liter of chilled, stirred absolute ethanol. The mixture is allowed to stand in an ice box overnight, whereupon a cream colored solid separates from the milky solution. Most of the milky supernatant liquid is siphoned off and the remaining mixture is filtered. The product is washed several times with absolute ethanol, sucked almost to dryness, and dried in vacuo yielding an almost white solid which is sodium 4 - (N - 2 - pyrimidylsulfamyl)benzenestibonyl-gluconate and which has the probable structural formula

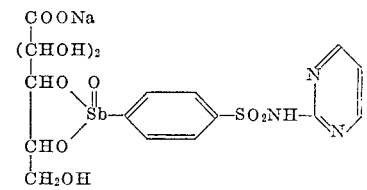

A sample prepared in the above manner weighed about 25 g. and gave the following analysis. Calcd. for $C_{16}H_{17}N_3NaO_{10}SSb$: Sb, 20.7 N, 7.14. Found: Sb (dry basis), 18.0; N (dry basis), 7.35°; moisture (100° C.), 5.75.

*Example 7*

This preparation may be run like previous examples, but using 11.9 g. (0.067 mole) of delta-gluconolactone and 2.7 g. (0.067 mole) of sodium hydroxide in 65 ml. of water, 33.0 g. (0.067 mole) of pyridinium 4-chlorobenzenestibonic pentachloride, and 46.9 g. (0.40 mole) of beta-diethylaminoethanol dissolved in 47 ml. of water. After the addition of the diethylaminoethanol solution, about 5 g. of insoluble material remains even after the mixture is heated to 75° C. The reaction mixture is filtered, and the filtrate is added slowly, with stirring, to 2 liters of absolute ethanol. After standing overnight in an ice box, the somewhat hygroscopic product is filtered and dried in vacuo, yielding about 5 g. of powder. A second crop of about 19 g. of crude product is obtained by the addition of dilute sodium hydroxide solution to the mother liquor.

The above crude product is dissolved in 75 ml. of water, the solution is filtered, and the filtrate is added dropwise with stirring to a chilled solution of 500 ml. of absolute ethanol and 250 ml. of ether. The mixture is placed in an ice box overnight, the precipitated product is filtered, washed with absolute ethanol, and transferred while still moist to a vacuum desiccator for drying. This product, sodium 4-chlorobenzenestibonylgluconate, has the probable structural formula

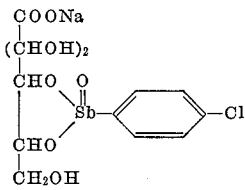

A sample thus prepared weighed about 17 g. and gave the following analysis. Calcd. for $C_{12}H_{13}ClNaO_8Sb$: Sb, 26.2. Found Sb (dry basis), 23.0, 23.3; moisture (100° C.) 9.1.

Related sodium halophenyl antimony gluconates are prepared by using the appropriate halophenyl antimony polyhalide in place of pyridinium 4-chlorobenzenestibonic pentachloride in the above example. Thus, sodium 3-amino-4-chlorobenzenestibinylgluconate is obtained from 3-amino-4-chlorobenzenestibinic dichloride; sodium 4-chlorobenzenestibonylgluconate, from ammonium 4-chlorobenzenestibonic pentachloride; sodium 2,4,6-tribromobenzenestibonylgluconate, from pyridinium 2,4,6-tribromobenzenestibonic pentachloride; sodium 2,4-diiodobenzenestibonylgluconate, from quinolinium 2,4-diiodobenzenestibonic pentachloride.

*Example 8*

This preparation is carried out like previous examples, but using 8.0 g. (0.045 mole) of delta-gluconolactone and 3.6 g. (0.090 mole) of sodium hydroxide dissolved in 50 ml. of water, 21.9 g. (0.045 mole) of pyridinium 4-methoxybenzenestibonic pentachloride, and a solution of 31.5 g. (0.27 mole) of beta-diethylaminoethanol in 32 ml. of water. Addition of the filtered aqueous solution to 1 liter of 95% ethanol yields about 18 g. of crude product containing chloride ion. This material may be re-precipitated several times according to directions given in the above examples to yield about 11 g. of product, sodium 4-methoxybenzenestibonylgluconate, which is represented by the following probable structural formula

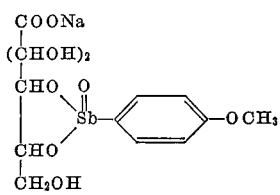

A sample thus prepared analyzed as follows. Calcd. for $C_{13}H_{16}NaO_9Sb$: Sb, 26.4; Na, 4.98. Found: Sb, 24.6, 24.8 (dry basis); Na, 5.8 (dry basis); moisture, 5.1 (100° C.).

Related sodium alkoxyphenyl antimony gluconates are obtained according to the foregoing procedure by using the appropriate alkoxyphenyl antimony polyhalide in place of pyridinium 4-methoxybenzenestibinic pentachloride. Thus, sodium 3-ethoxy-4-methoxybenzenestibinylgluconate is obtained from 3-ethoxy-4-methoxybenzenestibinic dichloride; sodium 3,4,5-trimethoxybenzenestibonylgluconate, from pyridinium 3,4,5-trimethoxybenzenestibonic pentachloride; sodium 4-isobutoxybenzenestibonylgluconate, from pyridinium 4-isobutoxybenzenestibonic pentachloride; sodium 4-n-hexoxybenzenestibonylgluconate, from quinolinium 4-n-hexoxybenzenestibonic pentachloride.

*Example 9*

This preparation may be carried out like previous examples, but using 6.05 g. (0.034 mole) of delta-gluconolactone and 1.36 g. (0.034 mole) of sodium hydroxide dissolved in 35 ml. of water, 17.2 g. (0.034 mole) of pyridinium 4-nitrobenzenestibonic pentachloride, and 23.8 g. (0.20 mole) of beta-diethylaminoethanol dissolved in 25 ml. of water. After addition of the aqueous amine, the mixture is heated at 60–70° C. for 45 minutes, filtered and the cooled filtrate is added to 1 liter of chilled 95% ethanol to yield about 7 g. of buff colored product. A second crop of about 4 g. is obtained by adding about 350 ml. of ether to the mother liquor. This product is sodium 4-nitrobenzenestibonylgluconate, and has the probable structural formula.

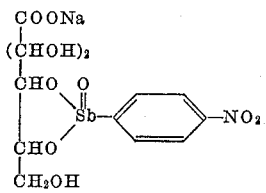

Related sodium nitrophenyl antimony gluconates are obtained by the above procedure using the appropriate nitrophenyl antimony polyhalide in place of pyridinium 4-nitrobenzenestibonic pentachloride. Thus, sodium 2-nitrobenzenestibonylgluconate is obtained from 2-nitrobenzenestibinic tetrachloride; sodium 3-nitrobenzenestibonylgluconate, from either 3-nitrobenzenestibonic tetrachloride or ammonium 3-nitrobenzenestibonic pentachloride; sodium 3-nitro-4-chlorobenzenestibonylgluconate, from 3-nitro-4-chlorobenzenestibonic tetrachloride.

*Example 10*

23.2 g. (0.05 mole) of pyridinium 4-sulfamylbenzenestibinic trichloride are added to a sodium gluconate solution (obtained from 8.9 g. (0.05 mole) of delta-gluconolactone, 25 ml. of 1.94 N (0.05 mole) sodium hydroxide solution and 25 ml. of water). To the resulting suspension is added dropwise with stirring a solution of 35 g. (0.30 mole) of beta-diethylaminoethanol in 35 ml. of water, after which the mixture is warmed to 75° C. until a clear solution results. On cooling, white crystals separate. The product weighs about 12 g. after being dried over $P_2O_5$ at 1 mm. for 14 hours, and corresponds to the beta-diethylaminoethanol salt of 4-sulfamylbenzenestibinylgluconic acid, having the probable structural formula

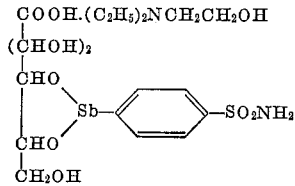

A sample thus prepared analyzed as follows. Calcd. for $C_{18}H_{31}N_2O_{10}SSb$: Sb, 20.7 Found: Sb, 20.5, 20.9.

*Example 11*

This preparation is carried out in the same way as Example 10, but using 40.0 g. (0.22 mole) of delta-gluconolactone, 112 ml. of 1.94 N (0.22 mole) sodium hydroxide solution, 105 g. (0.23 mole) of pyridinium 4-sulfamylbenzenestibinic trichloride, and a solution of 157 g. (1.35 mole) of beta-diethylaminoethanol in 160 ml. of water. The crystalline precipitate is then dissolved in 125 ml. of 1.94 N sodium hydroxide solution and added dropwise with stirring of 2 liters of cold absolute ethanol. The mother liquor is decanted from the yellow precipitated powder, which is covered with absolute ethanol, chilled in ice for 3 hours, filtered, and dried in vacuo over calcium chloride. The somewhat hygroscopic disodium salt weighs 35.0 g. It is sodium 4-(N-sodiosulfamyl)benzenestibinylgluconate and has the probable structural formula

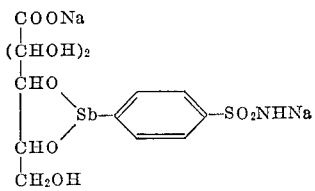

A sample thus prepared analyzed as follows. Calcd. for $C_{12}H_{14}NNa_2O_9SSb$: Na, 8.91; Sb, 23.6. Found: Na (dry basis), 7.50; Sb (dry basis), 21.7 21.8; moisture (100° C.), 10.15.

*Example 12*

This preparation is carried out like previous examples such as 5 or 6 except a 10% excess of the pyridinium antimony complex is used here whereas in previous examples equal molecular quantities of sodium gluconate and pyridinium antimony complex were used. The reactants used are 8.9 g. (0.050 mole) of delta-gluconolactone and 2.0 g. (0.050 mole) of sodium hydroxide in 100 ml. of water, 34.0 g. (0.055 mole) of pyridinium 4-(N-2-thiozolylsulfamyl)benzenestibonic pentachloride, a solution of 38.0 g. (0.33 mole) of beta-diethylaminoethanol in 40 ml. of water, and 900 ml. of absolute ethanol.

After the dropwise addition of the aqueous amine solution is completed, the mixture is heated to 60° C. to completely dissolve the solid present. This solution is stirred with charcoal about 15 minutes, filtered, and the pale yellow filtrate is added dropwise to the alcohol with stirring. The white precipitate is filtered and dried in vacuo (over sulfuric acid at 10 mm.) to yield 25 g. of water-soluble product which is sodium 4-(N-2-thiazolylsulfamyl) benzenestibonylguconate and which has the following probable structural formula

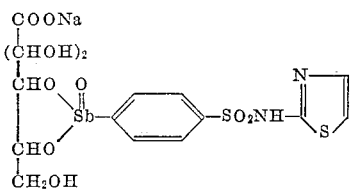

A sample thus prepared gave the following analysis. Calcd. for $C_{15}H_{16}N_2NaO_{10}S_2Sb$: Sb, 20.53. Found: Sb, 21.15.

*Example 13*

This preparation is run like Example 12, but instead of 8.9 g. of delta-gluconolactone, 10.4 g. (0.050 mole) of glucoheptonolactone is used. The white product that separates weighs about 34 g. and is completely water-soluble. It is sodium 4-(N-2-thiazolylsulfamyl)benzenestibonylglu- coheptonate and has the following probable formula

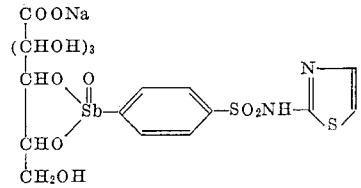

A sample thus prepared gave the following analysis. Calcd. for $C_{16}H_{18}N_2NaO_{11}S_2Sb$: Sb, 19.5. Found: Sb, 20.5.

When the foregoing procedure is followed but using sodium arabonate or sodium ribonate instead of sodium glucoheptonate, there is obtained, respectively, sodium 4-(N-2-thiazolylsulfamyl)-benzenestibonylarabonate or sodium 4-(N-2-thiazolylsulfamyl) benzenestibonylribonate. Similarly, using sodium ribonate in place of sodium glucoheptonate and sodium 4-(N-2-thiazolylsulfamyl)benzenestibinic trichloride in place of sodium 4-(N-2-thiazolylsulfamyl)benzenestibonic pentachloride, the resulting product is sodium 4-(N-2-thiazolylsulfamyl)benzenestibinylribonate.

*Example 14*

To a solution of monosodium tartrate (prepared from 4.5 g. (0.030 mole) of d-tartaric acid and 1.2 g. (0.030 mole) of sodium hydroxide in 60 ml. of water) is added 20.4 g. (0.033 mole) of pyridinium 4-(N-2-thiazolylsulfamyl) benzenestibonic pentachloride. To this mixture is added rapidly with stirring 22.0 g. (0.19 mole) of beta-diethylaminoethanol; and stirring is continued until a clear solution results. This solution is agitated with charcoal and filtered. The filtrate is added dropwise with stirring to 900 ml. of absolute ethanol to yield a yellow solid which is filtered and dried in vacuo (over sulfuric acid at 10 mm.). It is monosodium 4-(N-2-thiazolylsulfamyl)benzenestibonyltartrate and has the following probable structural formula

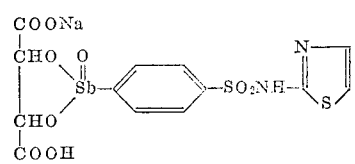

A sample thus prepared weighed about 10 g. and gave the following analysis. Calcd. for $C_{13}H_{10}N_2NaO_9S_2Sb$: Sb, 21.6. Found: Sb, 22.2.

Following the above procedure but using disodium tartrate or monosodium saccharate in place of monosodium tartrate, the resulting products are, respectively, disodium 4-(N-2-thiazolylsulfamyl)benzenestibonyltartrate or monosodium 4-(N-2-thiazolylsulfamyl)benzenestibonylsaccharate. Similarly when the above procedure is followed but using pyridinium 4-(N-2-thiazolylsulfamyl)benzenestibinic trichloride instead of pyridinium 4-(N-2-thiazolylsulfamyl)benzenestibonic pentachloride, there is obtained monosodium 4-(N-2-thiazolylsulfamyl)benzenestibinyltartrate.

In the above examples some of the antimony analyses will be noted to be rather unsatisfactory, but this appears unavoidable in view of the difficulty we have experienced in obtaining the compounds completely moisture-free.

The pyridinium arylstibonic pentachlorides and the pyridinium arylstibinic trichlorides used in the above examples can be prepared according to the general procedures given by P. Pfeiffer and K. Schneider, Ber. 68B, 50–60 (1935). See also G. Doak and H. Steinman, p. 15K of Abstracts of Papers presented at the 108th Meeting of the American Chemical Society, New York, N. Y., September 11–15, 1944.

For use in practicing our invention we have prepared the following pyridinium aryl antimony polychlorides which have not been previously described in published literature:

Pyridinium benzenestibonic pentachloride.
Pyridinium 4-acetamidobenzenestibonic pentachloride
Pyridinium 4-acetamido-3-chlorobenzenestibonic pentachloride
Pyridinium 4-carbamylbenzenestibonic pentachloride
Pyridinium 4-sulfamylbenzenestibonic pentachloride
Pyridinium 4-(N-2-pyrimidylsulfamyl(benzenestibonic pentachloride
Pyridinium 4-(N-2-thiazolylsulfamyl) benzenestibonic pentachloride
Pyridinium 4-chlorobenzenestibonic pentachloride
Pyridinium 4-nitrobenzenestibonic pentachloride
Pyridinium 4-sulfamylbenzenestibinic trichloride This application is a continuation-in-part of our copending U. S. patent application Serial No. 667,487, filed May 4, 1946.

We claim:

1. An organic compound of antimony in which one of the antimony linkages is directly connected to a nuclear carbon atom of an aryl radical selected from the group consisting of the unsubstituted phenyl radical and phenyl radicals substituted by from one to three substituents selected from the class consisting of halo, lower alkyl, lower alkoxyl, lower carbalkoxyl, hydroxyl, nitro, carbamyl, amino, lower alkanoylamino, sulfamyl, N-2-thiazolylsulfamyl and N-2-pyrimidylsulfamyl, two of the antimony linkages are connected to alcoholate oxygen atoms of a salt of an acid selected from the group consisting of lower poly-hydroxyalkanoic and lower poly-hydroxyalkanedioic acids having from three to seven carbon atoms and, where antimony is pentavalent, the remaining two antimony linkages are connected to a single oxygen atom.

2. An organic compound of pentavalent antimony in which one of the antimony linkages is directly connected to a nuclear carbon atom of a lower alkanoylaminophenyl radical, two of the antimony linkages are connected to alcoholate oxygen atoms of a salt of a hexonic acid and the remaining two antimony linkages are connected to a single oxygen atom.

3. An organic compound of pentavalent antimony in which one of the antimony linkages is directly connected to a nuclear carbon atom of a sulfamylphenyl radical, two of the antimony linkages are connected to alcoholate oxygen atoms of a salt of a hexonic acid and the remaining two antimony linkages are connected to a single oxygen atom.

4. An organic compound of trivalent antimony in which one of the antimony linkages is directly connected to a nuclear carbon atom of a sulfamylphenyl radical and the remaining two antimony linkages are connected to alcoholate oxygen atoms of a salt of a hexonic acid.

5. Sodium 4-acetamidobenzenestibonylgluconate wherein pentavalent antimony is linked to two alcoholate oxygen atoms of sodium gluconate and to the para position of the acetamidobenzene nucleus, said compound being identical with the compound prepared by reacting sodium gluconate with pyridinium 4-acetamidobenzenestibonic pentachloride in the presence of beta-diethylaminoethanol.

6. Sodium 4-sulfamylbenzenestibonylgluconate wherein pentavalent antimony is linked to two alcoholate oxygen atoms of sodium gluconate and to the para position of the sulfamylbenzene nucleus, said compound being identical with the the compound prepared by reacting sodium gluconate with pyridinium 4-sulfamylbenzenestibonic pentachloride in the presence of beta-diethylaminoethanol.

7. The beta-diethylaminoethanol salt of 4-sulfamylbenzenestibinylgluconic acid wherein trivalent antimony is linked to two alcoholate oxygen atoms of gluconic acid and to the para-position of the sulfamylbenzene nucleus, said compound being identical with the compound prepared by reacting sodium gluconate with pyridinium 4-sulfamylbenzenestibinic trichloride and beta-diethylaminoethanol.

8. A process for the preparation of an organic compound of antimony in which one of the antimony linkages is directly connected to a nuclear carbon atom of an aryl radical selected from the group consisting of the unsubstituted phenyl radical and phenyl radicals substituted by from one to three substituents selected from the class consisting of halo, lower alkyl, lower alkoxyl, lower carbalkoxyl, hydroxyl, nitro, carbamyl, amino, lower alkanoylamino, sulfamyl, N-2-thiazolylsulfamyl and N-2-pyrimidylsulfamyl, two of the antimony linkages are connected to alcoholate oxygen atoms of a salt of an acid selected from the group consisting of lower polyhydroxyalkanoic and lower polyhydroxyalkanedioic acids having from three to seven carbon atoms and, where antimony is pentavalent, the remaining two antimony linkages are connected to a single oxygen atom, which comprises reacting a salt of an acid selected from the group consisting of lower polyhydroxyalkanoic and lower polyhydroxyalkanedioic acids having from three to seven carbon atoms with an aryl antimony polyhalide selected from the group consisting of arylstibinic dihalides, arylstibonic tetrahalides and pyridinium, quinolinium and ammonium halide double salts thereof where the aryl radical is defined as above, in the presence of a weak base.

9. A process for the preparation of an organic compound of pentavalent antimony in which one of the antimony linkages is directly connected to a nuclear carbon atom of (lower alkanoyl)-aminophenyl radical, two of the antimony linkages are connected to alcoholate oxygen atoms of a salt of a hexonic acid and the remaining two antimony linkages are connected to a single oxygen atom, which comprises reacting a salt of a hexonic acid with a pyridinium (lower alkanoyl)-aminobenzenestibonic pentachloride in the presence of a weak base.

10. A process for the preparation of an organic compound of pentavalent antimony in which one of the antimony linkages is directly connected to a nuclear carbon atom of a sulfamylphenyl radical, two of the antimony linkages are connected to alcoholate oxygen atoms of a salt of a hexonic acid and the remaining two antimony linkages are connected to a single oxygen atom, which comprises reacting a salt of a hexonic acid with a pyridinium sulfamylbenzenestibonic pentachloride in the presence of a weak base.

11. A process for the preparation of an organic compound of trivalent antimony in which one of the antimony linkages is directly connected to a nuclear carbon atom of a sulfamylphenyl radical and the remaining two antimony linkages are connected to alcoholate oxygen atoms of a salt of a hexonic acid, which comprises reacting a salt of a hexonic acid with a pyridinium sulfamylbenzenestibinic trichloride in the presence of a weak base.

12. A process for the preparation of sodium 4-acetamidobenzenestibonylgluconate, which comprises treating sodium gluconate in an aqueous medium with pyridinium 4-acetamidobenzenestibonic pentachloride in the presence of beta-diethylaminoethanol, thereafter mixing the aqueous solution thus formed with a large excess of ethanol and recovering the resulting precipitated sodium 4-acetamidobenzenestibonylgluconate.

13. A process for the preparation of sodium 4-sulfamylbenzenestibonylgluconate, which comprises treating sodium gluconate in an aqueous medium with pyridinium 4-sulfamylbenzenestibonic pentachloride in the presence of beta-diethylaminoethanol, thereafter mixing the aqueous solution thus formed with a large excess of ethanol, and recovering the resulting precipitated sodium 4-sulfamylbenzenestibonylgluconate.

14. A process for the preparation of the beta-diethylaminoethanol salt of 4-sulfamylbenzenestibinylgluconic acid, which comprises warming sodium gluconate in an aqueous medium with pyridinium 4-sulfamylbenzenestibinic trichloride and beta-diethylaminoethanol.

SYDNEY ARCHER.
ROBERT K. BAIR.

References Cited in the file of this patent

UNITED STATES PATENTS

| Number | Name | Date |
| --- | --- | --- |
| 1,851,450 | Schmidt | Mar. 29, 1932 |
| 2,066,742 | Schmidt | Jan. 5, 1937 |

FOREIGN PATENTS

| Number | Country | Date |
| --- | --- | --- |
| 234,677 | Great Britain | June 4, 1923 |
| 176,206 | Switzerland | June 1935 |